W. CONRON.
SKATE.
APPLICATION FILED NOV. 15, 1916.
Reissued Feb. 13, 1917.
14,259.
2 SHEETS—SHEET 1.
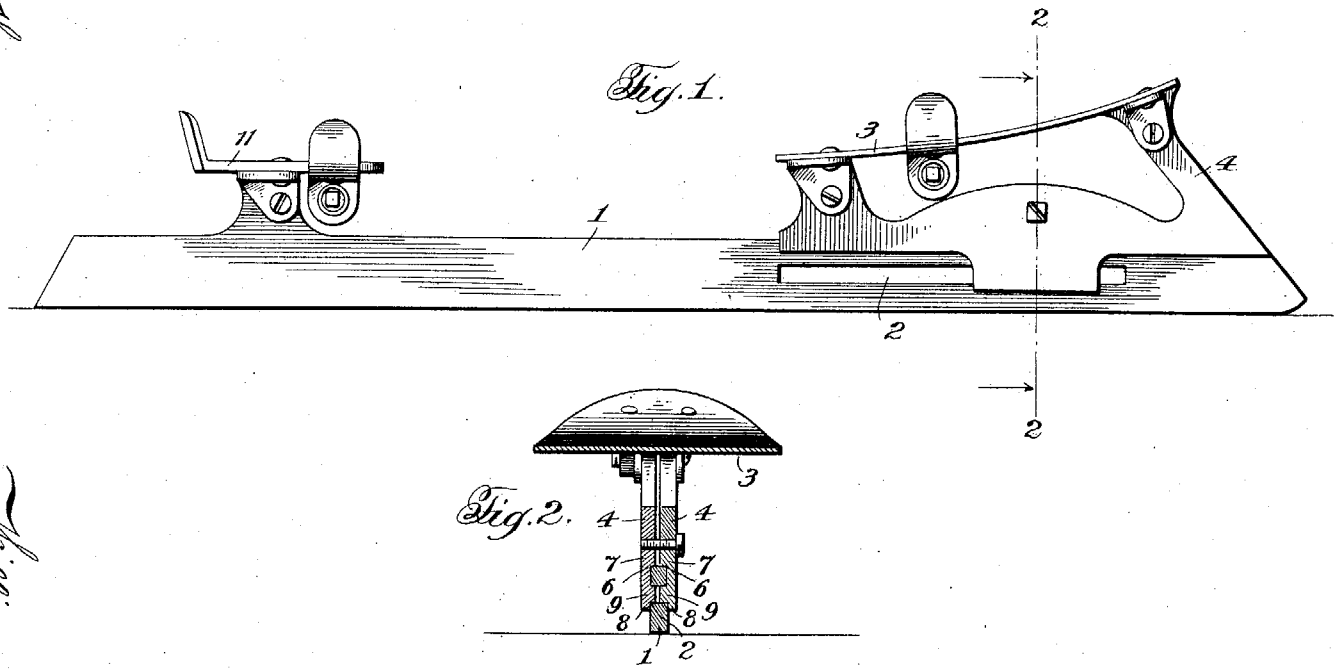
Witness:
Jas. E. Hitchinson.
By
Inventor:
William Conron,
Bacon & Mulaux
Attorneys.

W. CONRON.

SKATE.

APPLICATION FILED NOV. 15, 1916.

Reissued Feb. 13, 1917.

14,259.

2 SHEETS—SHEET 2.

Inventor:

Witness:

Jas. E. Hutchinson.

By

William Conron,

Bacon & Mulan

Attorneys.

UNITED STATES PATENT OFFICE.

WILLIAM CONRON, OF DANVILLE, ILLINOIS, ASSIGNOR TO CONRON-McNEAL COMPANY, OF KOKOMO, A CORPORATION OF INDIANA.

SKATE.

14,259. Specification of Reissued Letters Patent. Reissued Feb. 13, 1917.

Original No. 1,054,508, dated February 25, 1913, Serial No. 688,974, filed April 6, 1912. Application for reissue filed November 15, 1916. Serial No. 131,391.

*To all whom it may concern:*

Be it known that I, WILLIAM CONRON, a citizen of the United States, residing at Danville, in the county of Vermilion and State of Illinois, have invented certain new and useful Improvements in Skates, of which the following is a specification, reference being had therein to the accompanying drawing.

This invention relates to an improvement in skates and has for its object the provision of simple means for the adjustment of a supporting plate member lengthwise with relation to the runner and to clamp the same in the adjusted position to accommodate feet of different lengths.

The invention comprises a skate, the runner of which is slotted or grooved lengthwise to form an overhang part in connection with a plate support having associated parts constructed and adapted to embrace the upper edge of the runner and engage the same below the overhang or in the groove from opposite sides and to be there secured by a suitable screw, bolt or the equivalent means.

A further object of the invention is that of the provision of an adjustable supporting plate movable with relation to the runner of a skate, so that the plate may be adjusted longitudinally of the runner without the necessity of disconnecting entirely the connecting parts.

My invention further consists in certain novel features of construction of importance which will be hereinafter fully described and pointed out in the claims.

In the accompanying drawings:

Figure 1 is a view in side elevation;

Fig. 2 is a transverse vertical sectional view;

Figure 5:
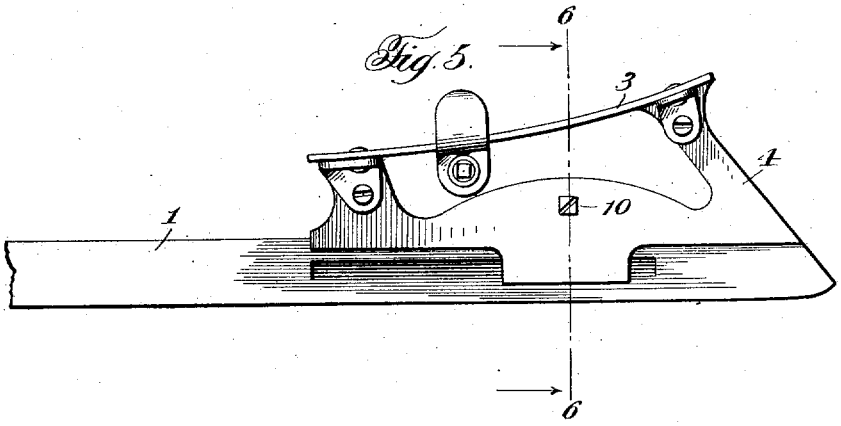
Fig. 5 is a view in side elevation of a slightly modified form which my invention might take.
Figure 3:
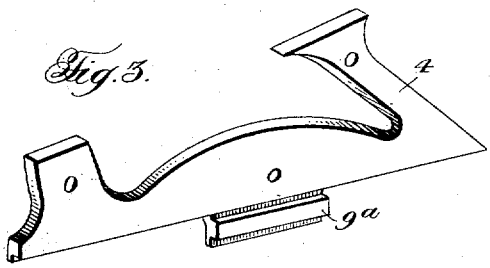
Fig. 3 is a detached view of one member of the sole support.
Figure 6:
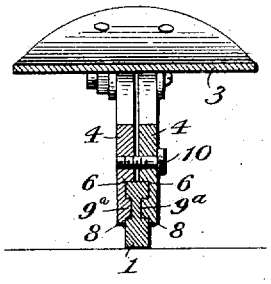
Fig. 6 is a transverse sectional view on the line 6—6 of Fig. 5.
Figure 4:
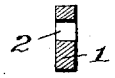
Fig. 4 is a transverse sectional view through the slotted portion of the runner.
Figure 7:
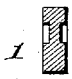
Fig. 7 is a transverse section through the runner.

In the construction illustrated in Figs. 1, 2, and 3, the runner 1 is provided with a slot 2, which extends lengthwise or longitudinally thereof. The sole-plate 3 is riveted or otherwise secured to the sole-plate support, the latter being preferably composed of two plates 4, 4, the forward and rear ends of which are attached to corresponding ends of the sole-plate, and the lower edges of which are reduced in thickness to constitute shoulders 6, 6, which rest upon the upper edge of the runner for a considerable distance, and side flanges 7, 7, which embrace the runner from opposite sides. These flanges have an elongated portion 8, 8, which has inwardly-extending cleats 9, 9, approximately an inch in length which enter and fit the slot 2 from opposite sides in which they have extended bearings, and where they are held securely by a bolt or screw 10 after the sole-plate has been adjusted to accommodate the length of the shoe of the skater.

In lieu of the slots, the blade might be grooved on opposite sides, in which event the cleats $9^a$, $9^a$, would be correspondingly reduced in thickness, and in other respects the skate would remain unchanged.

From the foregoing it will be seen that the sole-plate support is adjustably but securely clamped to the runner, and sufficient length of bearing is afforded therefor, so that strength and rigidity are in no wise sacrificed for the purpose of this adjustment. At the same time the shifting of the sole-plate is made quick, easy, and certain.

The head of the screw or bolt may be both angular and slotted, so that it may be turned with the use of a key or wrench or screw-driver, as best suits the user's convenience. It will be observed further that the heel-plate 11 and sole-plate 3 are entirely independent of each other, that is, there being no screw-adjustment between them as is customary, and they having no connection with each other except through the runner.

Having thus described my invention, what I claim as new and desire to secure by Letters Patent, is:—

1. A skate comprising a runner, a foot rest thereon, and means for slidingly adjustably securing the foot rest to the runner at various positions lengthwise of the latter, including a lateral enlargement at the upper edge of the runner and clamping means carried by the foot rest and adapted to engage around the upper edge of the runner and beneath said enlargement.

2. A skate comprising a runner, a foot rest thereon, and means for slidingly adjustably securing the foot rest to the runner at various positions lengthwise of the latter, including lateral enlargements extending a substantial distance along the upper edges of the runner at opposite sides thereof, and clamping means carried by the rest and adapted to engage around the upper edge of the runner and beneath said enlargements.

3. A skate comprising a runner, heel and sole plates, entirely disconnected from each other, and one at least of which has a slidable adjustable connection with the runner.

4. A skate comprising a recessed runner, heel and sole-plates, and a support for one of said plates provided with inwardly-projecting, elongated cleats fitted to the recess in the runner, and means for tightening up and clamping these cleats in the recess whereby the support may be adjusted along the runner and secured in its adjusted position.

5. A skate comprising a recessed runner, heel and sole-plates entirely disconnected from each other, one of which is adjustable, and a support for said adjustable plate comprising two members having elongated shoulders thereon and provided with flanges which rest upon and embrace from opposite sides the upper edge of the runner, and provided with elongated portions which have inwardly extending cleats adapted to enter the recessed portion of the runner from opposite sides, and means for clamping said members securely to the runner.

6. A skate comprising a runner, clamps embracing a portion of the latter from opposite sides and having adjustable sliding clamped connection with a portion of the runner, and a plate supported by the clamps.

In testimony whereof I have hereunto set my hand.

WILLIAM CONRON.

Copies of this patent may be obtained for five cents each, by addressing the "Commissioner of Patents, Washington, D. C."